Jan. 23, 1945. J. B. DAVIS 2,367,821
APPARATUS FOR MAKING FAN BELTS
Filed May 31, 1941 2 Sheets-Sheet 1
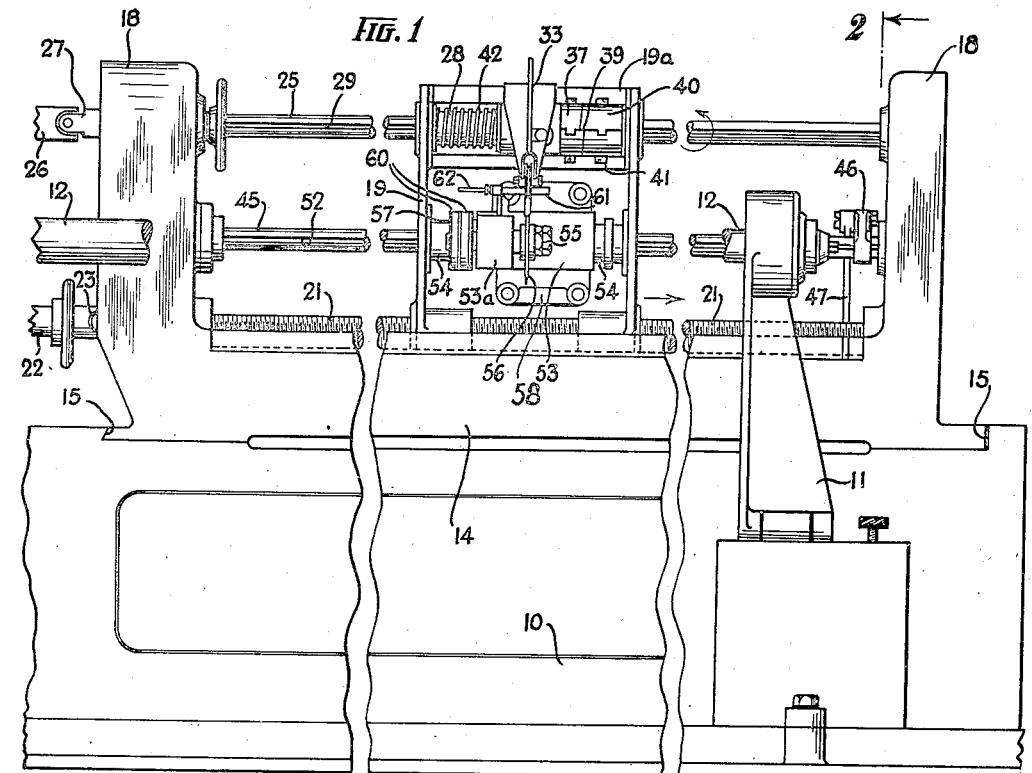
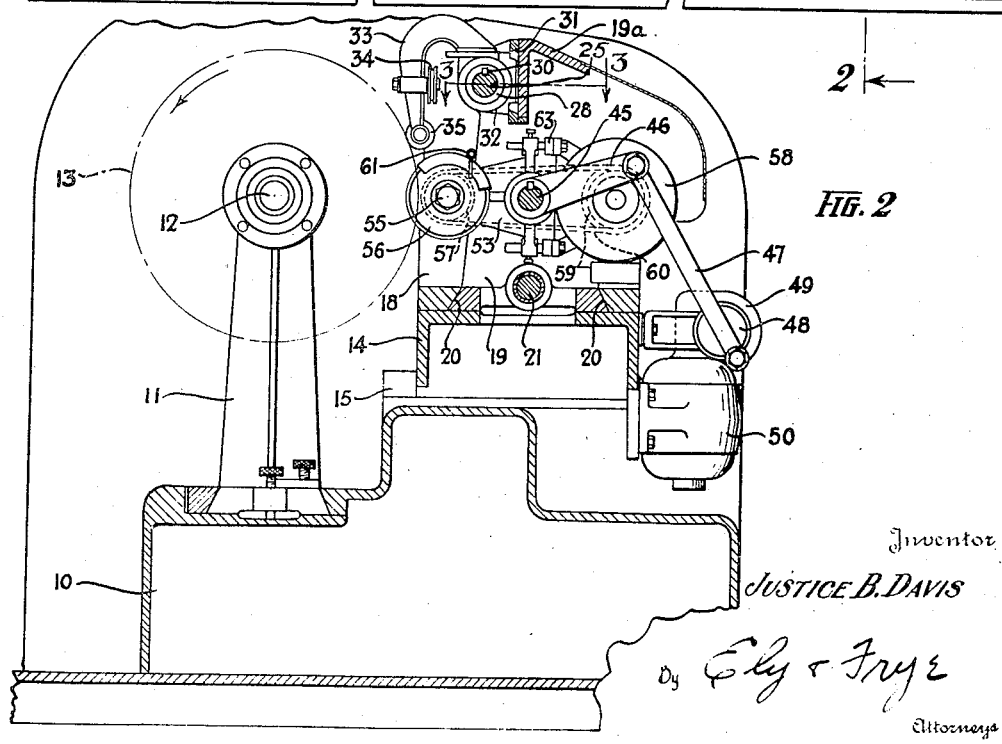
Inventor
JUSTICE B. DAVIS
by Ely & Frye
Attorneys Jan. 23, 1945.         J. B. DAVIS         2,367,821
APPARATUS FOR MAKING FAN BELTS
Filed May 31, 1941         2 Sheets-Sheet 2
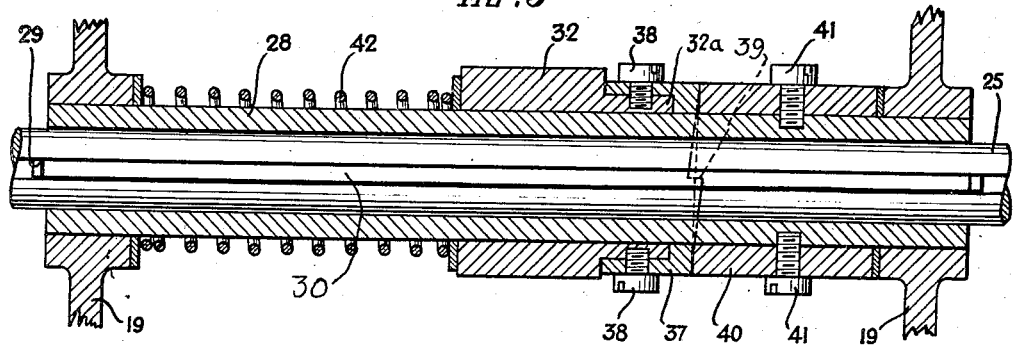
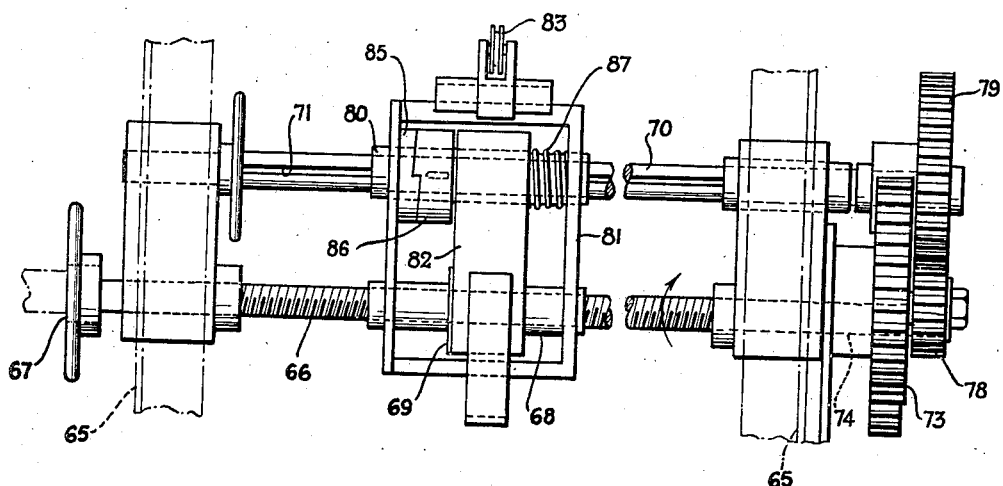
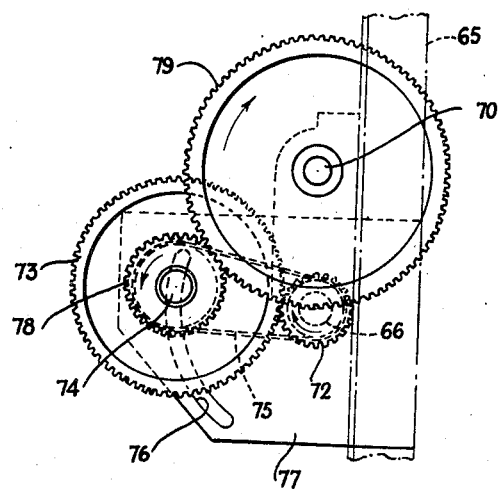
Inventor
JUSTICE B. DAVIS
By Ely & Fryk
Attorneys Patented Jan. 23, 1945

2,367,821

UNITED STATES PATENT OFFICE 2,367,821

APPARATUS FOR MAKING FAN BELTS

Justice B. Davis, Akron, Ohio, assignor to The Firestone Tire & Rubber Company, Akron, Ohio, a corporation of Ohio Application May 31, 1941, Serial No. 395,939

16 Claims. (Cl. 154—3)

This invention relates to improved apparatus for use in the manufacture of small endless transmission belts, such as fan belts for motor vehicles.

Fan belts are manufactured in accordance with this application by mounting a layer of belt stock upon a collapsible form, and winding spaced sets of convolutions of a continuous reinforcing cord upon the belt stock. The convolutions of cord are then covered with additional belt stock, and the individual belts are cut from the form at the regions of the frabricated structure that are disposed between the sets of convolutions of cord. Such cuts expose portions of the reinforcing cord, which portions subsequently are secured to the belt bodies in any suitable manner, during the completion of the belt-making process, to prevent said cords from protruding from the finished belts, whereby belts having reinforcing cords completely embedded therein are produced.

The chief object of the invention is to provide improved apparatus for applying reinforcing cords to fan belts in the manufacture thereof according to the aforementioned method. More specifically, the invention aims to provide apparatus for winding reinforcing cords upon a cylindrical belt-building drum in spaced apart sets, each set comprising a determinate number of laterally abutting convolutions. Other objects will be manifest as the description proceeds.

Of the accompanying drawings:

Figure 1 is a front elevation of apparatus embodying the invention;

Figure 2 is a section on the line 2—2 thereof;

Figure 3 is a diametric section through a cam structure of the apparatus;

Figure 4 is a front elevation of the invention as it appears in a modification; and Figure 5 is an end elevation of the structure shown in Figure 4 as viewed from the right thereof.

Referring now to Figures 1 to 3 of the drawings, there is shown an apparatus comprising a foundation or base structure 10 having mounted thereon, at the front thereof, a pair of upright supports, such as the support 11, in which a driven shaft 12 is journaled, which shaft is adapted to support a collapsible drum or form, indicated at 13 in broken lines in Figure 2, upon which the various plies of fan belt stock may be wound. Means (not shown) is provided for driving the shaft 12 at determinate speed, in the direction indicated by the arrow in Figure 2. One of the supports 11, at least, is slidably mounted upon the base 10, and is capable of movement axially of the shaft 12 to facilitate the mounting of the drum 13 on the latter. Mechanism for applying reinforcing cords to the fan belt structure being built upon drum 13, and for subsequently severing the sleeve of fan belt material on the drum into individual fan belt units, is carried upon a table 14 that is positioned upon the top of the base 10, rearwardly of the supports 11. The table 14 is mounted in suitable slideways 15, 15 and is adjustable in a fore-and-aft direction to move it toward or away from the drum 13.

At each end the table 14 is formed with upstanding bearing structures 18, 18, and between said bearing structures a slide 19 is mounted in sildeways 20, 20 on said table, the slideways enabling the slide 19 to move longitudinally of the table, back and forth between said bearing structures 18. The slide 19 has the general shape of an inverted U, and for moving the same laterally along slideway 20 a feed screw 21 is provided, said feed screw being threaded through the respective legs of the slide at the bottom thereof. The feed screw 21 is journaled at its respective ends in the bearing structures 18, and at one end is connected to a power-driven shaft 22 through the agency of a universal joint 23. The feed screw 21 is driven at determinate speed relatively of the shaft 12 of the form 13 so that reinforcing cords may be guided properly onto said form.

The mechanism for guiding a reinforcing cord onto the form 13 comprises a driven shaft 25 that is journaled at its ends in the bearing structures 18, and at one end is connected to a drive shaft 26 through the agency of a universal coupling 27. Between the bearing structures 18 the shaft 25 extends through the respective vertical legs of the U-shaped slide 19, and carries a bushing 28, which bushing is journaled at its ends in the respective legs of the slide 19. The shaft 25 is formed with a keyway 29 that extends from end to end thereof, and a key 30, Figure 2, engaged in said keyway provides driving between said shaft and bushing, the arrangement being such the bushing will be rotated by the shaft at all times as the slide 19 is moved longitudinally of the table 14 by the feed screw 21. The upper part of the slide 19 comprises a horizontal portion 19a, the front of which is formed with a horizontal slideway 31 in which slide 32 is mounted, the latter locally embracing the bushing 28 substantially in the medial region thereof. The slide 32 has a bracket 33 of goose-neck shape that constitutes a cord guide mounted thereon and extending forwardly and downwardly therefrom. The cord guide 33 has a pair of guide sheaves 34, 35 journaled thereon for guiding reinforcing cord from any convenient source of supply to the drum 13, the sheave 35 bearing against the surface of the drum during operation of the apparatus.

As is clearly shown in Figure 3, the bushing 28 is free to rotate relatively of the slide 32, and said slide is capable of limited movement axially of the bushing. Such axial movement of the slide 32 relatively of the bushing 28 is utilized for so guiding the reinforcing cord to the drum 13 as to lay the cord thereon in spaced-apart sets or groups of laterally abutting convolutions. To this end means is provided for effecting axial movement of the slide 32 at determinate intervals. More specifically, the slide 32 is moved slowly to the left, as viewed in the drawings, and then quickly returned to point of starting once during each revolution of the shaft 25. The means employed for effecting such axial movement of the slide comprises an annular shoulder 32a formed on one side of the slide 32 concentrically of the bushing 28, and fixedly mounted on said shoulder is an annular face cam 37. For convenience this cam may be made in two semi-circular parts, each being secured to the shoulder 32a by a cap screw 38. The cam surface of the cam 37 is on the end face thereof that is remote from the slide 32, said cam surface defining a helix about the bushing 28, the ends of the helix being joined by a flat face 39 that is parallel to the axis of the cam. Mounted upon the bushing 28, between cam element 37 and the adjacent side wall of the slide 19, is a cylindrical cam element 40, the end face of the latter that confronts the cam element 37 being formed with a helical cam surface complemental to the cam surface on said element 37. For convenience the cam element 40 may be constructed in two semi-circular sections, each being secured to the bushing 28 by a cap screw 41. A compression spring 42 is mounted on the bushing 28, between a lateral wall of the slide 19 and the slide 32, on the side of the latter remote from the cams 37, 40, the arrangement being such as to urge the cam surfaces of said cams into engagement with each other at all times.

As previously stated, the feed screw 21 is driven at determinate speed relatively of the speed of rotation of the shaft 12 so as to feed the slide 19, to the right, as viewed in Figure 1 of the drawings. The shaft 25 also is driven at differential speed with relation to the speed of shaft 12 and feed screw 21. The bushing 28, slide 32 and cord guide 33 are all moved along the shaft 25 by reason of the lateral movement of the slide 19 induced by the feed screw 21, but since the slide 32 and cam element 37 thereon do not rotate with shaft 25, it will be apparent that rotation of bushing 28 will rotate cam element 40 thereon relatively of cam element 37. Since the axial position of cam 40 is fixed on the bushing 28 it follows that rotation of shaft 25 in the direction of the arrow in Figure 1 will cause the cam 40 to force the cam 37 away from it, and thus cause said cam and the slide 32 to move axially of bushing 28, to the left as viewed in Figures 1 and 3, against the force of the spring 42. Such movement of the slide 32 relatively of the slide 19 continues until the shaft 25 has made one complete revolution, at which time the flat, axially extending surface 39 of the rotating cam element 40 comes into registry with the complemental surface of the cam element 37, whereupon the spring 42 is enabled to expand and quickly move the slide 32 to the right, back to point of starting.

From the foregoing it will be apparent that the cord guide 33 will move to the right, during the winding of reinforcing cord onto the drum 13, during relatively long intervals at uniform speed, which intervals are interrupted or separated by relatively short or instantaneous intervals of much greater speed. Furthermore, it will be apparent that the movement of the cord guide 33 at uniform speed is the result of the speed of movement of the slide 19 in one direction and the slower movement of the slide 32 in the opposite direction. Moreover, the rotary speed of the feed screw 21 is so correlated with the speed of rotation of the shaft 12 that the cord guide 33, moving laterally at its resultant uniform speed, will lay a reinforcing cord upon the drum 13 in a plurality or set of laterally abutting convolutions. When the cord guide is moved laterally quickly under the impetus of the spring 42, it so lays the cord on the drum as to produce the spacing between succeeding sets of laterally abutting convolutions. By varying the speed of the shaft 25 with relation to the speed of rotation of the feed screw 21 the length of the intervals of uniform movement of the cord guide 33 may be controlled, with resultant control of the number of convolutions of reinforcing cord in each set or group of laterally abutting convolutions.

The slide 19 moves to the right as viewed in the drawings during the application of reinforcing cord to the fan belt structure on the drum 13. After the reinforcing cord is applied to the drum from one end thereof to the other, the feed screw 21 may be reversed and the slide 19 impelled thereby back to point of starting. The operations described may be repeated if additional layers of reinforcing cords are to be applied to the drum. After the reinforcing cord is mounted on the belt stock on the drum, additional layers of belt stock are applied to the drum to cover said cords. The table 14 and all the mechanism thereon may be moved rearwardly, away from the drum 13, to facilitate the application of additional belt stock to the drum. As soon as all the plies of belt stock are mounted on the drum, the cylinder of belt stock is ready to be severed into individual fan belt units, the sleeve being cut between adjacent groups of reinforcing cords therein. Such cutting may be done manually, but preferably is accomplished mechanically and automatically by cutting mechanism operatively associated with the cord-laying apparatus just described. Such cutting mechanism, however, is not a part of the present invention, and therefore needs only a brief description herein.

Said cutting mechanism comprises a rock shaft 45 that is disposed between the feed screw 21 and shaft 25 parallel to both of them, said rock shaft being journaled at its ends in the bearing structures 18. At one end of the rock shaft 45 a rearwardly extending rocker arm 46 is mounted thereon, the free end of said rocker arm having one end of a link or pitman 47 pivotally connected thereto, the other end of said link being pivotally connected to a rotary disc or crank 48, eccentrically of the axis thereof, the arrangement being such as to effect the rocking of the shaft 45 as the disc 48 is rotated. The disc 48 is mounted upon the driven shaft of a reduction gear device 49, that is carried by the frame of an electrical motor 50 and is driven thereby, said motor being mounted upon the table 14 at the rear thereof.

The rock shaft 45 extends through suitable apertures in the lateral walls of the slide 19, and is formed with a keyway 52 extending from one of its ends to the other. Mounted upon the rock shaft 45, between the lateral walls of the slide 19, is a bracket 53 that is keyed to the rock shaft but is capable of movement longitudinally thereof by reason of the elongated keyway 52. Spacer sleeves 54, 54 slidably mounted upon the rock shaft between the lateral walls of the slide 19 and the respective confronting ends of the bracket 53 maintain the latter against axial movement relatively of the slide 19, yet enabling the bracket to move angularly relatively of said slide when the rock shaft is rocked. Formed integral with the bracket 53 and extending forwardly thereof is a journal bearing 53a that carries a shaft 55, one end of the latter carrying a disc cutter 56 and the other end thereof carrying a grooved driving pulley 57. Also carried by the bracket 53, rearwardly of the shaft 45, is a supporting structure 58 for an electric motor 59, the shaft of the latter carrying a grooved driving pulley 59 that has driving connection with the pulley 57 through the agency of a pair of transmission belts 60. The support 58 with motor 59 thereon is adjustable relatively of bracket 53 so as to maintain the belts 60 in taut condition. Normally the motor 59 is constantly driven.

The cutting mechanism described is idle during the fabrication of a sleeve of fan belt material on the drum 13. After said sleeve of material is completely formed, the slide 19 is moved to the lefthand end of the apparatus in Figure 1, and the cutting operation initiated. Control means (not shown) is provided for intermittently driving the feed screw 21 to move the slide 19 toward the right a distance equal to the width of one fan belt, and for intermittently driving the motor 59 at intervals when the slide 19 is stationary, it being understood that the motor 59 is constantly driven and that the shaft 12 with drum 13 thereon is constantly rotating during the cutting operation. The driving of the motor 59 continues until the disc has made one complete revolution, with the result that the rock shaft 45 is rocked and the rotating cutter 56 is raised from a depressed inoperative position to the operative position shown in Figure 2, and then returned to point of starting. In its operative position the cutter 56 is in engagement with the sleeve of fan belt material on the drum 13, and said operative position is maintained while the drum makes a complete revolution so that complete circumferential severing of the fan belt material is effected. After the cutter returns to point of starting the motor 59 ceases operation and the slide 19 is indexed laterally the distance of an individual fan belt. The cutting operation as described is then automatically repeated. The cutting of the fan belt stock is facilitated by liquid lubricant applied to the cutting disc 56 by means of a nozzle 61 on the end of a supply hose 62 that has connection with a reservoir of lubricant (not shown).

From the foregoing it will be apparent that the apparatus is accurate and efficient in its operation and achieves the other advantages set out in the foregoing statement of objects.

The embodiment of the invention shown in Figures 4 and 5 is essentially similar to that previously described, in that it lays the reinforcing cord upon the fan belt stock on the building drum in spaced-apart groups of laterally abutting convolutions. It is, however, of somewhat simpler construction. It comprises a pair of spaced-apart frame elements 65, 65 that provide end journals for a threaded feed screw 66, said feed screw being connected to a suitable driving means by a clutch 67. A threaded sleeve 68 having an annular flange 69 intermediate its ends is mounted on the feed screw 66 so as to be fed axially of said feed screw as the same is rotated. Also journaled in the frames 65, parallel to feed screw 66, is a driven shaft 70 having a keyway 71 therein extending from end to end thereof. The shaft 70 is driven by the feed screw 66 at determinate differential speed with relation to the latter, and to this end a gear 72 is mounted upon one end of said feed screw. The gear 72 is meshed with a pinion 73 of large size mounted upon a stub shaft 74 that is journaled in the free end of an angularly adjustable arm 75, which arm is movable about the feed screw 66 as a pivot. Movement of the arm 75 is limited by an arcuate slot 76 in a bracket structure 77 carried by a frame member 65, a portion of said stub shaft 74 extending through said slot. The stub shaft 74 also carries a gear 78, which gear is meshed with a pinion 79 of larger size that is secured on the adjacent end of shaft 70. By altering the position of the stub shaft 74 in the slot 76, different size gears may be substituted for the gear 78 to drive the shaft 70, with the result that the differential speed of shaft 70 with relation to feed screw 66 may be varied, the shaft 70, however, always rotating a determinate number of complete revolutions slower than the feed screw.

The shaft 70 has a sleeve 80 slidably mounted thereon for movement axially of the shaft, said sleeve being keyed to the shaft so as to rotate therewith. Supported by the threaded sleeve 68 and the sleeve 80 is an open rectangular frame 81, said frame being slidably mounted on said sleeves for movement relatively thereof in the direction of their axes. Also carried by sleeves 68 and 80, within the frame 80, is a carriage member 82, which member abuts one side of the flange 69 of sleeve 68. The sleeve 80 is free to rotate relatively of carriage 82, but the carriage is secured to sleeve 68 so as to prevent rotation thereof, whereby said sleeve moves axially of feed screw 66 as the latter is rotated. The frame 81 carries a guide pulley 83 over which reinforcing cord is drawn onto the fan belt stock of the building drum, and the frame is required to have the same peculiar lateral movement as the slide 32 of the previously described embodiment, in order that the cord may be laid on the drum in spaced-apart groups of laterally abutting convolutions.

To this end cam means is provided, said means comprising an annular face cam element 85 that is secured to the frame 81, concentrically of the sleeve 80, and a complementally shaped annular face cam 86 mounted upon the sleeve 80 and secured thereto. A compression spring 87 mounted upon the sleeve 80 between the carriage 82 and the frame 81 normally urges said frame to the right as viewed in Figure 4, relatively of said carriage, and thereby maintains the confronting cam faces of the cam elements 85, 86 in operative association. The cam surfaces of the cams 85, 86 are similar to the cam surfaces of cams 37, 40 of the previously described embodiment of the invention and function in the same manner as the latter.

In operation, the feed screw 66 is rotated to move the bushing 68 and frame 81 and carriage 82 thereon to the right as viewed in Figure 4.

The shaft 70, concurrently rotating at much slower speed than the feed screw, turns the cam 86 relatively of the cam 85 and thereby moves the frame 81 to the left, relatively of the carriage 82, against the action of spring 87. As the frame 81 is so moved it guides the reinforcing cord onto the rotating drum in laterally abutting helical convolutions. As soon as the shaft makes one complete revolution, cams 85, 86 are brought into registry and the spring 87 moves frame 81 quickly to the right relatively of carriage 82, with the result that the reinforcing cord is so laid on the building drum as to provide a space between the previously applied set of convolutions and the subsequently applied set.

Other modification may be resorted to without departing from the spirit of the invention or the scope thereof as defined by the appended claims.

What is claimed is:

1. In apparatus for making fan belts, the combination of a member, means for moving said member along a fixed course, cord-guiding means carried by said member, cam means operatively associated with said cord-guiding means for temporarily retarding the movement thereof with relation to said member and thereafter releasing said guiding means, and spring means urging said guiding means forwardly whereby said guiding means is rapidly impelled a short distance when said cam means release said guiding means.

2. In apparatus for making fan belts, the combination of a member, means for moving said member along a fixed course at uniform rate, supporting means including a cord-guide thereon carried by said member, cam means operatively associated with said supporting means for intermittently uniformly retarding the forward movement of said supporting means and then releasing said supporting means, and spring means urging said supporting means forwardly relatively of said member whereby said supporting means is rapidly impelled a short distance when said cam means release said supporting means.

3. In apparatus for making fan belts, the combination of a member, means for moving said member along a fixed course at a uniform rate, supporting means having a cord guide thereon slidably carried by said member, cam means carried by said member and operatively associated with said supporting means for intermittently uniformly retarding the movement of said supporting means as it moves with said member and then releasing said supporting means for forward movement to regain its initial position with relation to said member, and spring means for urging said supporting means forwardly relatively of said member, said spring being compressed when said cam means retard said supporting means, whereby said supporting means is rapidly impelled forwardly a short distance when the cam means release the same.

4. In fan belt manufacturing apparatus, the combination of a supporting frame, a threaded feed screw journaled in said supporting frame, a driven shaft parallel to said feed screw journaled in said supporting frame, means for driving said shaft and feed screw, a sleeve threaded onto said feed screw, a second sleeve slidably mounted on said shaft and keyed thereto, a carriage member carried by said sleeves and secured to the threaded sleeve, a frame slidably supported by said sleeves, a cam element carried by said frame, a complemental cam element carried by and rotating with the second sleeve, said cam elements being in operative engagement with each other, and a spring carried by said second sleeve between said frame and said carriage urging said frame forwardly with relation to the movement of said threaded sleeve, said cam temporarily retarding the forward movement of said frame and subsequently in its rotation freeing said frame for a substantial forward movement whereby said spring quickly impels said frame forwardly as the result thereof.

5. In a fan belt manufacturing apparatus, the combination of a supporting frame, a feed screw journaled therein, a rotatable shaft parallel to said feed screw journaled in said supporting frame, means driving said shaft and feed screw, a sleeve threaded onto said feed screw and movable axially thereof by reason of rotation of the feed screw, a second sleeve slidably mounted upon said shaft and rotating therewith, a carriage member carried by and extending between said sleeves and secured to the threaded sleeve, a movable open frame slidably supported on said sleeves, an annular face cam secured to said movable frame concentrically of said second sleeve, a second cam carried by said second sleeve and rotating therewith, said cams being in operative engagement with each other, and a spring carried by said second sleeve between said carriage and said movable frame to urge said frame forwardly with relation to said threaded sleeve, said cams retarding the movement of said movable frame with relation to the movement of the threaded sleeve and thereby compressing said spring, said cams subsequently freeing said frame and enabling said spring to impel the frame quickly forwardly an appreciable distance.

6. In fan belt manufacturing apparatus, the combination of feed screw, a shaft disposed parallel to said feed screw in spaced relation thereto, drive means for rotating said shaft and feed screw at differential speeds, a sleeve threaded on said feed screw and formed integrally with a circumferential flange, said sleeve being movable axially by rotation of the feed screw, a second sleeve slidably keyed to said shaft, a carriage member supported by said sleeves and fixedly connected to the threaded sleeve in abutting relation to the flange thereof, a frame comprising cord-guiding means slidably mounted on said sleeves, an annular face cam carried by said frame concentrically of said second sleeve, a second cam secured on said second sleeve, and a spring mounted upon said second sleeve between said carriage and said frame to urge said frame forwardly with relation to the movement of said threaded sleeve and to maintain said cams in operative association with each other, said cams being so shaped as initially to retard the movement of the frame relatively of the movement of the threaded sleeve and thereby to compress said spring, said cams subsequently releasing said frame and enabling the spring to effect a short, rapid, forward movement thereof.

7. In a fan belt manufacturing apparatus, a main frame, a feed screw journaled in said frame, a keyed shaft disposed parallel to said feed screw also journaled in said frame, means driving said shaft and screw in the same direction, a threaded sleeve having an annular flange thereon engaged with said feed screw and being moved therealong by rotation thereof, a second sleeve carried by and rotating with said keyed shaft, a carriage member carried by and extending between said sleeves, said carriage abutting the forward side of said flange, a mobile frame having a cord guiding means thereon slidably mounted upon said sleeves adjacent said carriage member, an annular cam element secured to said mobile frame and circumscribing said keyed sleeve adjacent one side of said frame, a cam carried by and rotating with said keyed sleeve intermediate its ends, said cam having a flat face parallel to its axis, the ends of said flat face being connected by a circumferential helix, said cam engaging a complementally formed surface of said cam element, and a spring carried on said keyed sleeve between said mobile frame and said carriage member to urge said frame forwardly with relation to the movement of said threaded sleeve, said cam initially retarding the movement of said cam element and mobile frame with relation to the threaded sleeve and thereby compressing said spring, said cam subsequently in its rotation releasing said frame for a substantial forward movement whereby said spring is enabled to jump the frame forwardly.

8. In a fan belt manufacturing apparatus, a main frame, a feed screw journaled in said frame, a keyed shaft journaled in said frame parallel to said feed screw, means driving said shaft and screw in the same direction, a threaded sleeve mounted upon said feed screw and moved therealong by rotation thereof, a second sleeve carried by and rotating with said keyed shaft, a carriage member carried by and extending between said sleeves, a mobile frame mounted for sliding movement upon said sleeves, an annular cam element secured to said mobile frame and circumscribing said second sleeve, a cam carried by and rotating with said second sleeve, said cam engaging said cam element, and a spring carried on said second sleeve between said mobile frame and said carriage member to urge said frame forwardly with relation to the movement of said threaded sleeve, said cam retarding the movement of said cam element and mobile frame with relation to the movement of said threaded sleeve and thereby compressing the spring, said cam subsequently in its rotation releasing said mobile frame for a substantial forward movement, whereby said spring is enabled to jump said frame forwardly.

9. In a fan belt manufacturing apparatus, a main frame, a feed screw journaled in said frame, a keyed shaft journaled in said main frame parallel to said feed screw, means rotating said shaft and feed screw, a threaded sleeve mounted on said feed screw, a second sleeve carried by and rotating with said keyed shaft, a carriage member carried by said sleeves, a mobile frame slidably mounted upon said sleeves, a cam element carried by said mobile frame, a cam carried by and rotating with said second sleeve, said cam engaging said cam element, and a spring carried on said second sleeve between said mobile frame and said carriage member to urge said mobile frame forwardly with relation to the movement of said threaded sleeve, said cam temporarily retarding the forward movement of said mobile frame and subsequently in its rotation releasing the latter for a substantial forward movement whereby said spring is enabled to jump said mobile frame forwardly.

10. In apparatus for manufacturing fan belts, a rotating member, means for moving said member along a definite course at uniform speed, supporting means in the form of a frame slidably carried by said member, said frame having a cord guide thereon and a carriage member mounted therein, said carriage also being slidably mounted on said member, a cam carried by said member and rotating therewith, a cam element fixed to said supporting means and adapted to cooperate with said cam for intermittently retarding the movement of said supporting means and cord guide thereon with relation to said member and subsequently releasing said supporting means for forward movement to regain its initial position with relation to said member, and spring means interposed between said frame and said carriage member for urging the latter forwardly with relation to said member, said spring means being compressed when said cam retards said supporting means, whereby the supporting means is rapidly impelled forward a short distance when released by rotation of said cam.

11. In apparatus for manufacturing fan belts, a rotating member, means for moving said member along a definite course at uniform speed, supporting means having a thread guide thereon slidably carried by said member, cam means interposed between said rotating member and said supporting means adapted intermittently to retard the forward movement of the latter with relation to the said rotating member, and then to cease said retarding action, and spring means operating against said supporting means to impel the latter forward a short distance when said cam means cease the retarding action.

12. Apparatus for making V-belts and the like and comprising a rotary drum on which a plurality of belts are built in side by side relation, means for rotating the drum, a carriage, means for moving the carriage transversely of the drum at a speed adjustably coordinated with the rotary speed of the drum, a sub-carriage on the carriage, cord feeding means carried by the sub-carriage, and means adjustably coordinated with the rotary speed of the drum for moving the sub-carriage slowly towards one end of the carriage at a speed less than the transverse speed of the carriage and in the opposite direction, and for then snapping the sub-carriage towards the other end of the carriage at a speed considerably greater than the transverse speed of the carriage and in the same direction as the transverse movement of the carriage.

13. Apparatus for making V-belts and the like and comprising a rotary means on which a plurality of belts are built in side by side relation, means for rotating the rotary means, a carriage, means for moving the carriage transversely of the rotary means at a speed adjustably coordinated with the rotary speed of the rotary means, a sub-carriage on the carriage, cord feeding means carried by the sub-carriage, and means adjustably coordinated with the rotary speed of the rotary means for moving the sub-carriage slowly towards one end of the carriage at a speed less than the transverse speed of the carriage and in the opposite direction, and for then snapping the sub-carriage towards the other end of the carriage at a speed considerably greater than the transverse speed of the carriage and in the same direction as the transverse movement of the carriage.

14. Apparatus for making V-belts and the like and comprising a rotary means on which a plurality of belts are built in side by side relation, means for rotating the rotary means, a carriage, means for moving the carriage transversely of the rotary means, a sub-carriage on the carriage, cord feeding means carried by the sub-carriage, and means for moving the sub-carriage slowly towards one end of the carriage at a speed less than the transverse speed of the carriage and in the opposite direction, and for then snapping the sub-carriage towards the other end of the carriage at a speed considerably greater than the transverse speed of the carriage and in the same direction as the transverse movement of the carriage.

15. Apparatus for making V-belts and the like and comprising a rotary drum on which a plurality of belts are built in side by side relation, a carriage movable transversely of the drum at a speed adjustably coordinated with the speed of the drum, a sub-carriage on the carriage, cord feeding means carried by the sub-carriage, and means adjustably coordinated with the speed of the drum for moving the sub-carriage slowly towards one end of the carriage and for then snapping the sub-carriage towards the other end of the carriage.

16. Apparatus for making a plurality of rubber and cord belts simultaneously and including rotary means for receiving and supporting a body of rubber material in wide band form, means for driving the rotary means, means for feeding a reinforcing cord to the body of rubber material, means for relatively moving the feeding means axially of the rotary means, cam means operatively associated with said cord feeding means for temporarily retarding the movement thereof and thereafter releasing said feeding means for periodically jumping at laterally coincident points the relative movement of the feeding means to increase the spacing between cord convolutions, means coordinated with the driving means for controlling the sequence of operation of the jumping means, means coordinated with the driving means for controlling the speed of relative movement of the feeding means, and means for cutting the fabricated material on the rotary means circumferentially in the region of the cord jumps to produce individual belts.

JUSTICE B. DAVIS.